United States Patent
Bloom

[11] Patent Number: 5,871,054
[45] Date of Patent: Feb. 16, 1999

[54] HOOF/SHOE ATTACHMENT DEVICE

[76] Inventor: Stephen E. Bloom, 920 Rte. 33, Bldg. 7, Freehold, N.J. 07728

[21] Appl. No.: 651,547

[22] Filed: May 22, 1996

[51] Int. Cl.$^6$ ..................................................... A01L 3/00
[52] U.S. Cl. ........................................ 168/17; 168/DIG. 1
[58] Field of Search ........................... 168/17, 11, DIG. 1

[56] References Cited

U.S. PATENT DOCUMENTS

| | | | |
|---|---|---|---|
| 592,261 | 10/1897 | Stephens | 168/DIG. 1 X |
| 1,212,266 | 1/1917 | Schrader et al. | 168/DIG. 1 X |
| 5,330,008 | 7/1994 | Sigafoos et al. | 168/DIG. 1 X |

Primary Examiner—Robert P. Swiatek

[57] ABSTRACT

A hoof/shoe attachment device (10) attaching a shoe (14) for a hoofed animal to the animal's hoof without the use of nails. The shoe (14) and an adapter (12) are held together by a adaptor fastener (12C) such as rivets. The hoof/shoe attachment device (10) comprises materials that prevents the rivet heads from pulling through. At least two fabric layers (adaptor cloth retainer upper layer (12BA) and adaptor cloth retainer lower layer (12BB) are embedded in the adaptor (12). The adaptor cloth retainer upper layer (12BA) is made from an arimid fiber known for abrasion resistance. The adaptor cloth retainer lower layer (12BB) is made from fiberglass. The hoof/shoe attachment device (10) when bonded to a hoof (16) results in a long wearing nailess shoe.

10 Claims, 3 Drawing Sheets

HOOF/SHOE ATTACHMENT DEVICE

BACKGROUND OF THE INVENTION

1. Field of the Invention

The present invention relates to an improvement in the attachment of shoes suitable for use on hoofed animals. More particularly, the present invention relates to improvement of a fastening means attaching a pad to a shoe and then to the hoof with a combination of fibers (fiberglass, SPECTRA) attached to the hoof with acrylic adhesives.

2. Description of the Prior Art

Numerous innovations for hoof/shoe attachment device have been provided in the prior art that are described as follows. Even though these innovations may be suitable for the specific individual purposes to which they address, they differ from the present invention as hereinafter contrasted.

In U.S. Pat No. 5,222,561, titled, Shoes and Pads for Horses, invented by Richard A. Fisher, et. al., comprises a fabrication material used to make horse shoes. The fabrication material has impregnated kinked wire strands to make the shoes more resistant to wear. The same material is used in horse shoe pads.

The present invention differs from the above described patented invention for the following reasons the present invention is an nailless attachment means which would utilize a shoe as described in the patented invention. The present invention is a method of attaching a pad and shoe to a horse or other hoofed animal.

In U.S. Pat. No. 4,565,250, titled, Horse Shoe Pad, invented by Kent A. Vasto comprises a horse shoe pad formed of shock absorbing materials in one layer and another layer comprising a stabilizing material such as fabric. The shock absorbing layer is made of a dense non-cellular polyurethane of linear structure. The fabric layer may be woven nylon. The pad is inserted between the hoof and the horse shoe at the time of shoeing. The shock absorbing layer is selected to match the shock loading predicted and measured.

The patented invention describes a cushioning device inserted between the horse shoe and the hoof. It is secured in place by nailing or gluing. While the patented invention has stabilizing layers made of a reenforcing fabric embedded within the pad, in the present invention, fabric is impregnated in the device to prevent the rivets from pulling through the pad material. The shoe is held to the pad by a fastening means which goes through the fabric.

In U.S. Pat. No. 3,494,422, titled Plastic Horse Shoe and Method of Applying to Hoof, invented by Frank M. Clark, a shoe formed of synthetic resin material, such as an elastomer polyurethane plastic, that may be cast to shape and size while being sufficiently flexible for close fitting to the hoof. The shoe exhibits resistance to wear and abrasion comparable to iron and other metallic shoes. It includes calks and cleats that may be trimmed, protective flange for the front edge of the hoof, and a channel for lubricant beneficial to the hoof. A method and apparatus for applying the shoes without nailing is described. The shape and size of the shoe can be adjusted by shortening a heel crossbar.

The patented invention describes a method of forming a shoe using a mold attached to a hoof. A synthetic resin material requiring curing is inserted into the mold. The invention further describes a method of gluing the shoe to the hoof of the horse using materials such as ESTAIN (™) and PLIBOND (™) both from B. F. GOODRICH COMPANY (™). The shoe is held to the hoof until the glue is cured by a specially designed clamp tightened about the hoof. The present invention is a nailless shoe attachment means utilizing any style of shoe. The attachment is also made by gluing to the hoof as in the patented invention, but the method is simpler. The present invention is an improved horse shoe incorporating a nailless attachment means. The present invention uses acrylic adhesives for the bonding the shoe to the hoof. The shoe, having the adapter attached, is tacked to the hoof with removable nails. The extensions of synthetic cloth layers protruding beyond the shoe and adapter are wrapped upwardly around the hoof and impregnated with an acrylic adhesive. After the acrylic adhesive has set (6–10) minutes, the nails are removed.

In U.S. Pat. No. 3,524,505, titled Thermally Cured Bonded Horse Shoe, invented by H. M. Ross is an apparatus and a method of bonding a shoe to the hoof of a horse including a novel method of leveling the hoof prior to bonding the shoe. The apparatus comprises a clamping member and guiding device that is clamped to a hoof. The apparatus supports a motorized device that planes the bottom surface of the hoof. A second device comprises a electrically heated and fluid cooled platen to fuse a shoe pre-coated with adhesive, to a hoof. An alternative device makes use of a shoe filled with an exothermic metallic oxidation reduction reactant which needs no external source of power. The shoes are formed by hand prior to attachment and have positive traction means on the ground side.

The patented invention is a method of forming and attaching a shoe to the hoof of a horse in place. The patented invention utilizes a heat setting adhesive deposited on a preformed shoe in one embodiment. The shoe is bonded to the hoof with the application of heat. A second embodiment utilizes a mold into which a thermoplastic material is injected and bonded to the hoof utilizing an exothermic metallic oxidation reduction reactant. The present invention differs from the patented invention in that the present invention uses any shoe riveted to an adapter. The entire assembly is then attached to the hoof utilizing quick setting adhesives. The present invention uses acrylic adhesives for the bonding the shoe to the hoof. The shoe, having the adapter attached, is tacked to the hoof with removable nails. The extensions of synthetic cloth layers protruding beyond the shoe and adapter are wrapped upwardly around the hoof and impregnated with an acrylic adhesive. After the acrylic adhesive has set (6–10) minutes, the nails are removed. The horse does not have to be immobilized during the procedure.

In U.S. Pat. No. 5,348,098, titled Shock-absorbing Horseshoe with Three Layers, invented by Benedetto Di Giulio comprises a horse-shoe having two aluminum layers sandwiching several layer of an elastic, shock-adsorbing material. The ground contact layer has recessed apertures so a fastening means head is recessed providing a flush ground contact surface.

The present invention differs from the patented invention in that the present invention uses a shoe with a cushioning spacer held to the shoe by a fastening means that is prevented from eroding the cushioning spacer by a fabric material. The whole assembly is then fastened to the hoof by an adhesive means. The patented invention utilizes nails for attachment where the present invention uses adhesives and cloth.

Numerous innovations for hoof/shoe attachment device have been provided in the prior art that are adapted to be used. Even though these innovations may be suitable for the specific individual purposes to which they address, they would not be suitable for the purposes of the present invention as heretofore described.

SUMMARY OF THE INVENTION

Shoes for hoofed animals are commonly made from metals such as steel or aluminum functioning to protect the hoof of an animal. The shoes are typically nailed to the hoof. This process is difficult to perform and requires an experienced person to accomplish it reliably. A small error in installing the nails can result in laming the horse. Standard shoes cannot be attached to the hoof without nails because adhesives are not available to bond metal to hoof material. Thus far, the best attachment means has been to mechanically fasten an adapter to the shoe using a number of fasteners penetrating the pad and the shoe. Experience has shown that the non-resilient nature of the shoe and the compressibility of the pad results in the heads of the fasteners eroding into the pad thus loosening the shoe. The present invention prevents this action by inserting a material selected to be resistant to the erosion by the fastener into the pad.

The types of problems encountered in the prior art are the attachment of the shock absorbing spacer to the shoe and the attachment of the shock absorbing spacer and shoe to the hoof. Because of dissimilar materials and the loading at the shock absorbing spacer/shoe interface, adhesives cannot maintain a reliable long term bond. Mechanically attaching the shock absorbing spacer to the shoe has resulted in the mechanical attachment means wearing through the shock absorbing spacer causing the shoe to separate from the assembly.

In the prior art, unsuccessful attempts to solve this problem were attempted namely special shock absorbing spacer/shoe combination requiring special installation equipment. The present invention practically solves the problem utilizing a mechanical fastener to hold any shoe to an adapter. The entire assembly is then attached to the hoof utilizing quick setting, acrylic adhesives, for the bonding the shoe to the hoof. The shoe, having the adapter attached, is tacked to the hoof with removable nails. The extensions of synthetic cloth layers protruding beyond the shoe and adapter are wrapped upwardly around the hoof and impregnated with an acrylic adhesive. After the acrylic adhesive has set (6–10) minutes, the nails are removed. The horse does not have to be immobilized during the procedure.

Innovations within the prior art are rapidly being exploited in the area of race horse shoes that protect the horses from damage and are of light weight materials.

The present invention produced unexpected results namely the breeding of race horses has resulted in a hoof structure with thinner walls offering less material for holding nails. The thinner walls make it more difficult to shoe a horse using conventual means because a slight error in driving a nail will cause it to enter soft tissue making the horse lame. The present invention solves this problem by utilizing an adhesive to attach the shock absorbing spacer/shoe to the hoof.

A synergistic effect was produced utilizing the present invention due to the fabric material of the present invention serves to provide a grip for positioning the shoe onto the hoof of the horse without any additional equipment.

Another synergistic effect was produced because the cloth is attached in strips the present invention does not interfere with the normal physiology of the hoof.

A further synergistic effect is achieved because the present invention can be applied to hoofs damaged by disease or having defects.

Accordingly, it is an object of the present invention to provide an adapter material with erosion resistant fabric that can be bonded to an animal hoof.

More particularly, it is an object of the present invention to provide a simple, long lasting, easily attached shoe/adapter to hoofed animals utilizing standard shoes.

In keeping with these objects, and with others which will become apparent hereinafter, one feature of the present invention resides, briefly stated, in the fabric imbedded in the adapter preventing the head of the attachment means, attaching a shoe to the adapter, from eroding the adapter material.

When the hoof/shoe attachment device is designed in accordance with the present invention, a more reliable longer lasting device is realized.

A feature of the present invention is the horse does not have to be immobilized with drugs during the procedure.

An additional feature of the present invention is the speed at which the process takes place, the present invention is suitable for field use.

In accordance with another feature of the present invention, is that the bonding of the hoof/shoe attachment device to the hoof eliminates the risk of lameness when shoeing a horse due to nails entering soft tissue causing injury to the animal.

Another feature of the present invention is that the hoof bottom can be prepared in the normal way used to apply standard shoes. The hoof bottom does not have to be specially prepared by grinding or machining.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawing.

BRIEF LIST OF REFERENCE NUMERALS UTILIZED IN THE DRAWING

10—hoof/shoe attachment device (10)
12—adaptor (12)
12A—adaptor pad (12A)
12AA—adaptor pad aperture (12AA)
12AC—adaptor pad lower surface (12AC)
12BA—adaptor cloth retainer upper layer (12BA)
12BB—adaptor cloth retainer lower layer (12BB)
12BC—adaptor cloth retainer third layer (12BC)
12BD—adaptor cloth retainer fourth layer (12BD)
12BC—upper adaptor cloth retainer aperture (12BC')
12BD—lower adaptor cloth retainer aperture (12BD)
12C—adaptor fastening means (12C)
12CA—adaptor fastening means head (12CA)
12CB—adaptor fastening means shank (12CB)
12D—adaptor lower surface (12D)
12E—toe piece (12E)
12EA—upper toe piece (12EA)
12EAA—upper toe piece aperture (12EAA)
12EB—lower toe piece (12EB)
12EBA—lower toe piece aperture (12EBA)
14—shoe (14)
14A—shoe aperture (14A)
14B—shoe upper surface (14B)
14C—shoe lower surface (14C)
16—hoof (16)
16A—hoof bonding surface (16A)

BRIEF DESCRIPTION OF THE PREFERRED EMBODIMENT

DETAILED DESCRIPTION OF THE PREFERRED EMBODIMENT

Figure 1:
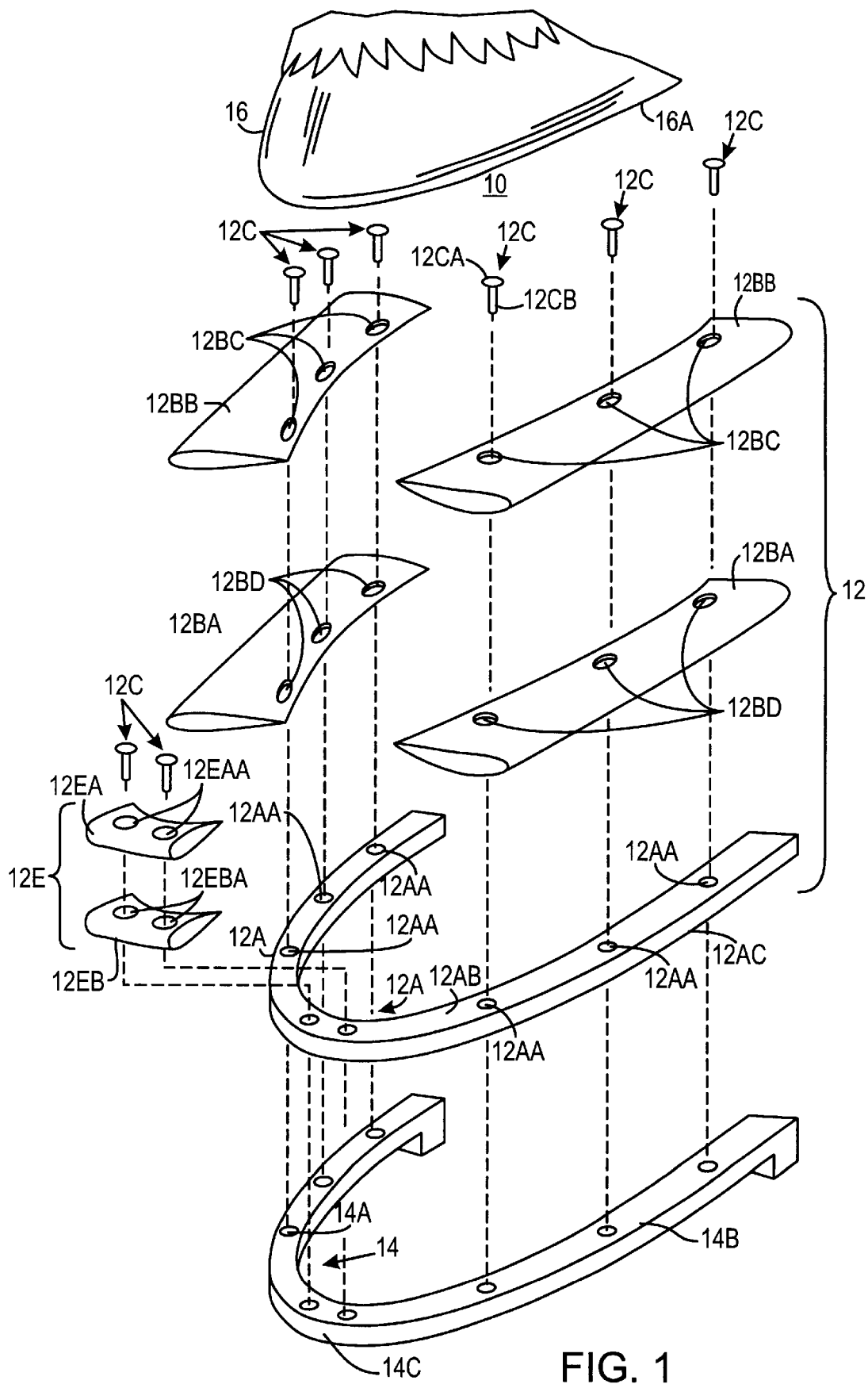
FIG. 1 is an exploded view of a hoof/shoe attachment device.

Referring to FIG. 1 which is an exploded view of a hoof/shoe attachment device (10) exhibiting the following features: adaptor (12), adaptor pad (12A), adaptor pad aperture (12AA), adaptor pad bonding surface (12AB), adaptor cloth retainer upper layer (12BA), adaptor cloth retainer lower layer (12BB), adaptor cloth retainer bonding surface (12DC), adaptor cloth retainer aperture (12BD), adaptor fastening means (12C), adaptor fastening means head (12CA), adaptor fastening means shank (12CB), adaptor pad lower surface (12AC), adaptor lower surface (12D), toe piece (12E), upper toe piece (12EA), upper toe piece aperture (12EAA), lower toe piece (12EB), lower toe piece aperture (12EBA), shoe (14), shoe aperture (14A), shoe upper surface (14B), shoe lower surface (14C), hoof (16), and hoof bonding surface (16A).

The hoof/shoe attachment device (10) comprises an adaptor (12). The adaptor (12) further comprises an adaptor pad (12A), having an adaptor cloth retainer upper layer (12BA) and an adaptor cloth retainer lower layer (12BB) embedded therewithin in alternating layers of fiberglass and SPECTRA (™) which prevents the adaptor fastening means head (12CA) from wearing through the adaptor pad (12A).

The adaptor (12) is mechanically fastened to a shoe (14) by a plurality of adaptor fastening means (12C) having an adaptor fastening means head (12CA) and an adaptor fastening means shank (12CB). The adaptor fastening means shank (12CB) is inserted through an upper adaptor cloth retainer aperture (12BC') and a lower adaptor cloth retainer aperture (12BD) and then through an adaptor pad aperture (12AA) and finally through a shoe aperture (14A) until it protrudes beyond a shoe lower surface (14C). The adaptor fastening means head (12CA) is pulled against the adaptor pad bonding surface (12AB) by clinching the adaptor fastening means (12C) against the shoe lower surface (14C). The clinching securely fastens a shoe upper surface (14B) against an adaptor pad lower surface (12AC).

The hoof/shoe attachment device (10) is securely fastened to a hoof (16) by applying a bonding agent to a hoof bonding surface (16A) and the adaptor pad bonding surface (12AB). The bonding takes place by bring the hoof bonding surface (16A) and the adaptor pad bonding surface (12AB) together and tacking the assembly to the hoof using removable nails to position and hold the hoof/shoe attachment device (10) in position until the bonding agent has cured. The adaptor cloth retainer upper layer (12BA,) the adaptor cloth retainer lower layer (12BB), upper toe piece (12EA), and lower toe piece (12EB), protrude outwardly from the adaptor pad (12). The protrusion of the adaptor cloth retainer upper layer (12BA), the adaptor cloth retainer lower layer (12BB), upper toe piece (12EA), and lower toe piece (12EB), outwardly from the adaptor pad (12A) are wrapped upwardly and around the hoof and wetted with bonding agent. After the bonding agent has cured the adaptor cloth retainer upper layer (12BA,) the adaptor cloth retainer lower layer (12BB), upper toe piece (12EA), and lower toe piece (12EB) securely attach the adapter to the hoof. The nails are then removed resulting in a nailess attachment of the hoof to the shoe.

The adaptor cloth retainer upper layer (12BA,) the adaptor cloth retainer lower layer (12BB), upper toe piece (12EA), and lower toe piece (12EB) when bonded to the hoof do not restrict the normal physiology of the hoof. The hoof can expand normally. Further since the adhesive means cures quickly the animal does not have to immobilized to attach the present invention.

The adaptor cloth retainer upper layer (12BA) the adaptor cloth retainer lower layer (12BB), upper toe piece (12EA), and lower toe piece (12EB) are constructed from a group of materials consisting of fiberglass, SPECTRA (™), petroleum distillates, plastic composites, and plastic.

Figure 2:
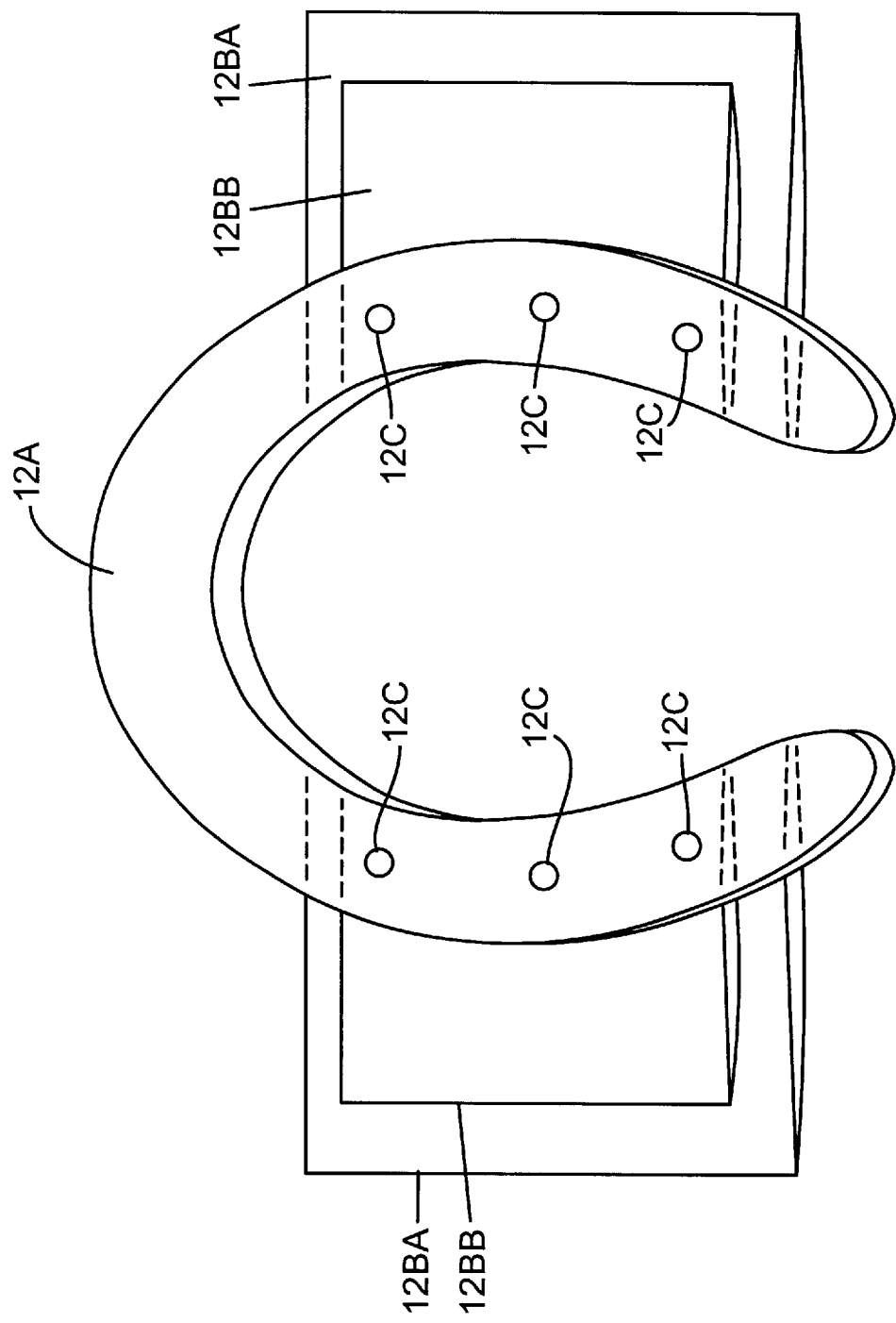
FIG. 2 is a top view of the hoof/shoe attachment device showing an adaptor cloth retainer upper layer and an adaptor cloth retainer lower layer embedded in the hoof/shoe attachment device.

Secondly referring to FIG. 2 which is a top view of the adaptor pad (12A) having the following features: adaptor pad (12A), adaptor cloth retainer upper layer (12BA), adaptor cloth retainer lower layer (12BB) and adaptor fastening means (12C).

The adaptor pad (12A) comprises an adaptor cloth retainer upper layer (12BA) and adaptor cloth retainer lower layer (12BB). The adaptor cloth retainer upper layer (12BA) and adaptor cloth retainer lower layer (12BB) are embedded within the adaptor pad (12A). The adaptor cloth retainer upper layer (12BA) is made from a fiberglass cloth material. The adaptor cloth retainer lower layer (12BB) is made from a Spectra (™) cloth material. The adaptor fastening means (12C) securely attaches the adaptor pad (12A) to the shoe (14).

Figure 3:
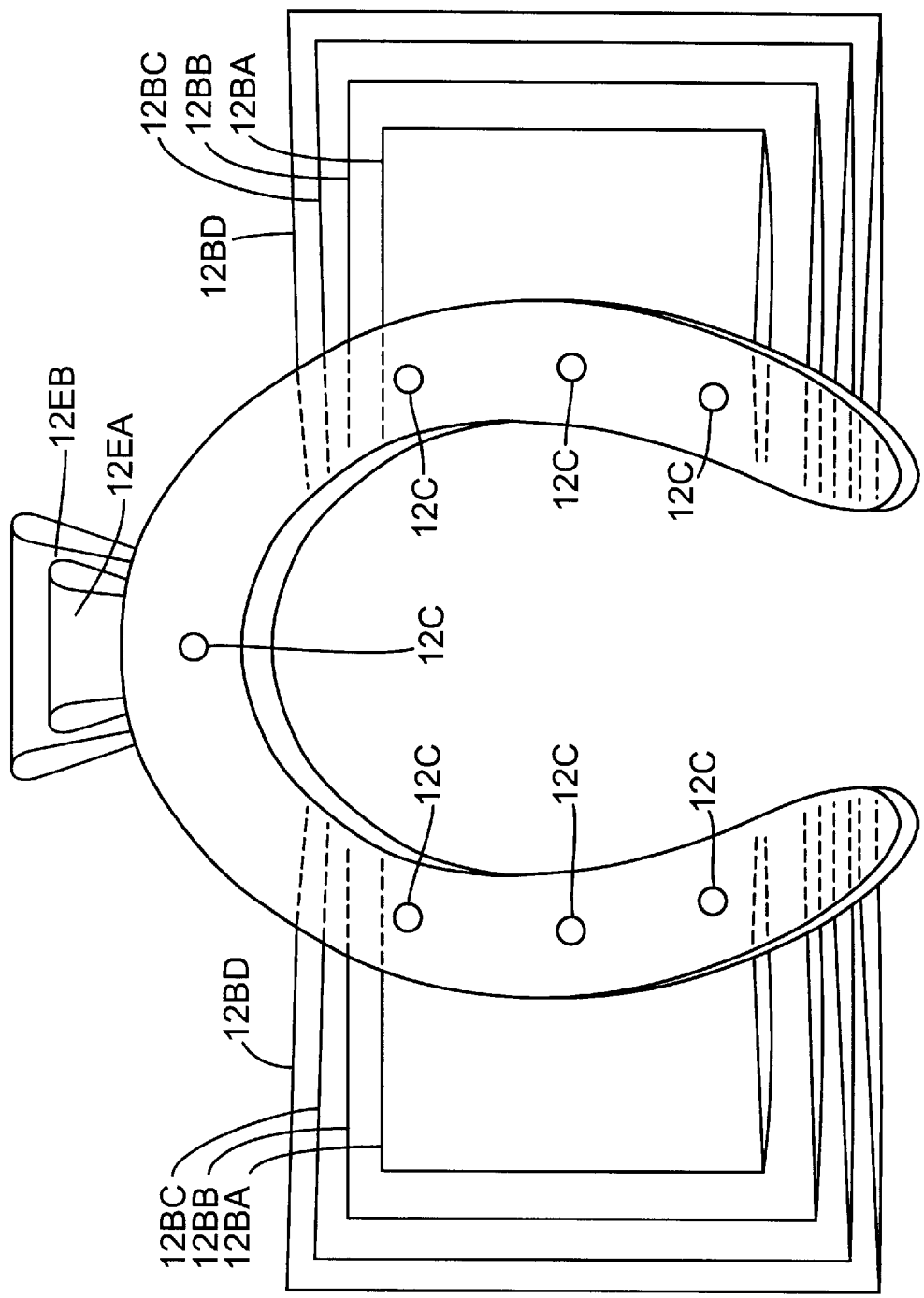
FIG. 3 is a top view of the hoof/shoe attachment device showing an adaptor cloth retainer upper layer, adaptor cloth retainer lower layer, adaptor cloth retainer third layer, and an adaptor cloth retainer fourth layer embedded in the hoof/shoe attachment device.

Secondly referring to FIG. 3 which is a top view of adaptor pad (12A) having the following features: adaptor pad (12A), adaptor pad bonding surface (12AB), adaptor cloth retainer upper layer (12BA), adaptor cloth retainer lower layer (12BB), adaptor cloth retainer third layer (12BC), adaptor cloth retainer fourth layer (12BD) adaptor fastening means (12C) upper toe piece (12EA) and lower toe piece (12EB).

The adaptor pad (12A) comprises an adaptor cloth retainer upper layer (12BA), adaptor cloth retainer lower layer (12BB), adaptor cloth retainer third layer (12BC) and adaptor cloth retainer fourth layer (12BD). The adaptor cloth retainer upper layer (12BA), adaptor cloth retainer lower layer (12BB), adaptor cloth retainer third layer (12BC), and adaptor cloth retainer fourth layer (12BD) are embedded within the adaptor pad (12A). The adaptor cloth retainer upper layer (12BA) is made from a fiberglass cloth material. The adaptor cloth retainer lower layer (12BB) is made from a SPECTRA (™) cloth material. The adaptor cloth retainer third layer (12BC) is made from a fiberglass cloth material. The adaptor cloth retainer fourth layer (12BD) is made from a SPECTRA (™) cloth material. The adaptor fastening means (12C) securely attaches the adaptor pad (12A) to the shoe (14).

The adaptor pad (12A) further comprises: an upper toe piece (12EA) and a lower toe piece (12EB). The upper toe piece (12EA) and a lower toe piece (12EB) are embedded within the adaptor pad (12A). The upper toe piece (12EA) is made from a fiberglass cloth material. The lower toe piece (12EB) is made from a SPECTRA (™) cloth material.

It will be understood that each of the elements described above, or two or more together, may also find an useful application in other types of constructions differing from the type described above.

While the invention has been illustrated and described as embodied in a hoof/shoe attachment device, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A hoof/shoe attachment device (10) utilized to fasten a shoe (14) to a hoof (16) comprising:

A) an adaptor (12) which comprises:
      i) an adaptor pad bonding surface (12A) having an adaptor bonding surface which is securely fastenable to a hoof bonding surface (16A),
      ii) an adaptor cloth retainer upper layer (12BA) impregnated on opposite sides into the adaptor pad (12A), an exposed area o the adaptor cloth retainer upper layer (12BA) being bendable around an outside of the hoof (16) and securely fastenable thereto by adhesive,
      iii) an adaptor cloth retainer lower layer (12BB) impregnated on opposite sides into the adaptor pad (12A) and positioned below the adaptor cloth retainer upper layer (12BA), an exposed area of the adaptor cloth retainer lower layer (12BB) being bendable around an outside of the hoof (16) and securely fastenable thereto by adhesive,
   B) a shoe (14) securely fastened to the adaptor (12) by an adaptor fastening means (12C).

2. The hoof/shoe attachment device (10) as described in claim 1, wherein the adaptor pad (12A) comprises at least one adaptor pad aperture (12AA) through which an adaptor fastening means shank (12CB) is passed therethrough securely fastening the adaptor pad (12A) to a shoe upper surface (14B).

3. The hoof/shoe attachment device (10) as described in claim 1, wherein the adaptor pad (12A) further comprises a toe piece (12E) impregnated into the adaptor pad (12A), an exposed area of the toe piece (12E) being bendable around an outside of the hoof (16) and securely fastenable thereto by adhesive.

4. The hoof/shoe attachment device (10) as described in claim 3, wherein the toe piece (12E) is selected from a group consisting of an upper toe piece (12EA) and a lower toe piece (12EB).

5. The hoof/shoe attachment device (10) as described in claim 4, wherein the upper toe piece (12EA) has at least one upper toe piece aperture (12EAA) therein and the lower toe piece (12EB) has at least one lower toe piece aperture (12EBA) therein, at least one adaptor fastening means (12C), positioned through the at least one upper toe piece aperture (12EAA) and the at least one lower toe piece aperture (12EBA) can secure the upper toe piece (12EA) and the lower toe piece (12EB), through at least one adaptor pad aperture (12AA) of the adaptor pad (12A), to the shoe (14).

6. The hoof/shoe attachment device (10) as described in claim 5, wherein the adaptor fastening means (12C) comprises an adaptor fastening means head (12CA) which is securely fastened to one distal end of the adaptor fastening means shank (12CB), an opposite distal end of the adaptor fastening means shank (12CB) is passed through the adaptor cloth retainer aperture (12BD), through the at least one adaptor pad aperture (12AA) and finally through a shoe aperture (14A), the adaptor fastening means shank (12CB) protrudes outwardly from the shoe lower surface (14C) and is clinched to securely fasten the adaptor pad (12A) and the shoe (14) together.

7. The hoof/shoe attachment device (10) as described in claim 1, wherein at least one cloth strip is selected from a group consisting of an adaptor cloth retainer upper layer (12BA), an adaptor cloth retainer lower layer (12BB), an upper toe piece (12EA), and a lower toe piece (12EB), the at least one cloth strip being bondable to an outside perimeter of the hoof (16).

8. The hoof/shoe attachment device (10) as described in claim 1, wherein the adaptor pad (12A) is constructed from a group of materials consisting of polyethylene, polypropylene, polyamides and polyimides.

9. The hoof/shoe attachment device (10) as described in claim 1, wherein a plurality of adaptor cloth retainer upper layers (12BA) and adaptor cloth retainer lower layers (12BB) are embedded in the adaptor pad (12A) in an alternating layer configuration.

10. The hoof/shoe attachment device (10) as described in claim 1, wherein the adaptor cloth retainer upper layer (12BA) and adaptor cloth retainer lower layer (12BB) are constructed from a group of materials consisting of fiberglass, petroleum distillates, plastic composites, and plastic.

* * * * *